(12) United States Patent
Jonker et al.

(10) Patent No.: US 9,732,896 B2
(45) Date of Patent: Aug. 15, 2017

(54) APPARATUS FOR DIVERTING A FLOW OF MATERIAL

(76) Inventors: Charles Kevin Jonker, Indio, CA (US); Randy Lee Willis, Landers, CA (US)

( * ) Notice: Subject to any disclaimer, the term of this patent is extended or adjusted under 35 U.S.C. 154(b) by 327 days.

(21) Appl. No.: 13/298,262

(22) Filed: Nov. 16, 2011

(65) Prior Publication Data

US 2013/0118615 A1    May 16, 2013

(51) Int. Cl.
| | |
|---|---|
| F01N 3/00 | (2006.01) |
| F01N 3/02 | (2006.01) |
| F01N 3/10 | (2006.01) |
| F01N 3/20 | (2006.01) |
| F16L 55/027 | (2006.01) |
| F01N 1/16 | (2006.01) |
| F02D 9/04 | (2006.01) |

(52) U.S. Cl.
CPC ............ F16L 55/027 (2013.01); F01N 1/166 (2013.01); F02D 9/04 (2013.01); F01N 2590/04 (2013.01)

(58) Field of Classification Search
USPC ............................................ 60/324; 137/875
See application file for complete search history.

(56) References Cited

U.S. PATENT DOCUMENTS

| | | | |
|---|---|---|---|
| 111,720 A * | 2/1871 | Bixby ............................ | 137/875 |
| 2,451,227 A * | 10/1948 | Krause ............................ | 96/399 |
| 2,993,513 A * | 7/1961 | Hyde ........................ | 137/625.11 |
| 3,592,221 A * | 7/1971 | Worley et al. ................ | 137/375 |
| 3,690,341 A * | 9/1972 | Sutko ............................ | 137/101 |
| 4,192,404 A | 3/1980 | Nakagawa | |
| 4,541,506 A | 9/1985 | Venning | |
| 4,585,023 A * | 4/1986 | Almada ........................ | 137/240 |
| 5,165,450 A * | 11/1992 | Marrelli ........................ | 137/875 |
| 5,899,805 A * | 5/1999 | Dowd et al. .................... | 454/76 |
| 5,908,047 A * | 6/1999 | Nakamura et al. ........... | 137/875 |
| 6,182,699 B1 * | 2/2001 | Hawkes ........................ | 137/875 |
| 6,955,188 B2 * | 10/2005 | Heckt ........................... | 137/875 |
| 7,347,045 B2 | 3/2008 | Bozmoski | |
| 7,380,638 B2 | 6/2008 | Willey | |
| 7,418,818 B2 | 9/2008 | Kato | |
| 2008/0035419 A1 | 2/2008 | Moore | |
| 2008/0053066 A1 | 3/2008 | Nakagome | |

\* cited by examiner

*Primary Examiner* — Audrey K Bradley
*Assistant Examiner* — Dapinder Singh
(74) *Attorney, Agent, or Firm* — Ariel S. Bentolila; Bay Area IP LLC

(57) ABSTRACT

An apparatus comprises an input chamber being configured for accepting a flow of material. An output chamber is configured for flowing the material along a first pathway and a second pathway. A diverter member is disposed within the input chamber. The diverter member comprises a half wing shape pivotally joined at a juncture of the input chamber and the output chamber. The diverter member is operable to be positioned at a first position for diverting the flow to the first pathway and to be positioned at a second position for diverting the flow to the second pathway. A lever mechanism is configured to be operable for moving the diverter member between the first position and the second position in which the flow is uninterrupted.

14 Claims, 5 Drawing Sheets

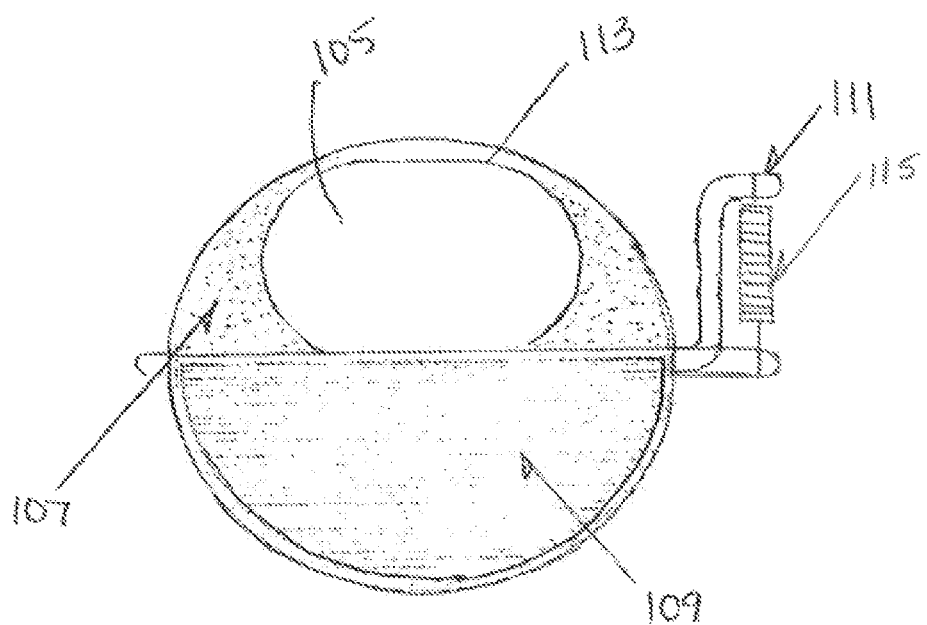

APPARATUS FOR DIVERTING A FLOW OF MATERIAL

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

One or more embodiments of the invention generally relate to controlling material flow. More particularly, the invention relates to a diverting device to control the flow of a material.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon. Motorcycle riders often enjoy a loud exhaust, partially since motorcycle riders feel the loud exhaust can alert other motorists of their presence. Also, it is believed that an unmuffled exhaust (i.e., straight pipes) provides better performance in sanctioned racing events. Presently some noise ordinances exist and are being proposed that require the sound from vehicle exhausts to remain below set loudness limits.

By way of educational background, an aspect of the prior art generally useful to be aware of is that currently some exhaust muffling systems are available. Some of these currently available systems are made specifically for automobiles rather than motorcycles. One particular exhaust system for automobiles comprises a Y-shaped design in a two-inch diameter. Also, some of these currently available systems require motors to operate. Many currently available systems comprise butterfly valves to control the flow of the exhaust gasses.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 1A through 1C illustrate an exemplary diverting device, in accordance with an embodiment of the present invention. FIG. 1A is a cutaway side view. FIG. 1B is a diagrammatic end view of an inlet side, and FIG. 1C is a diagrammatic end view of an outlet side;

Figure 1A:
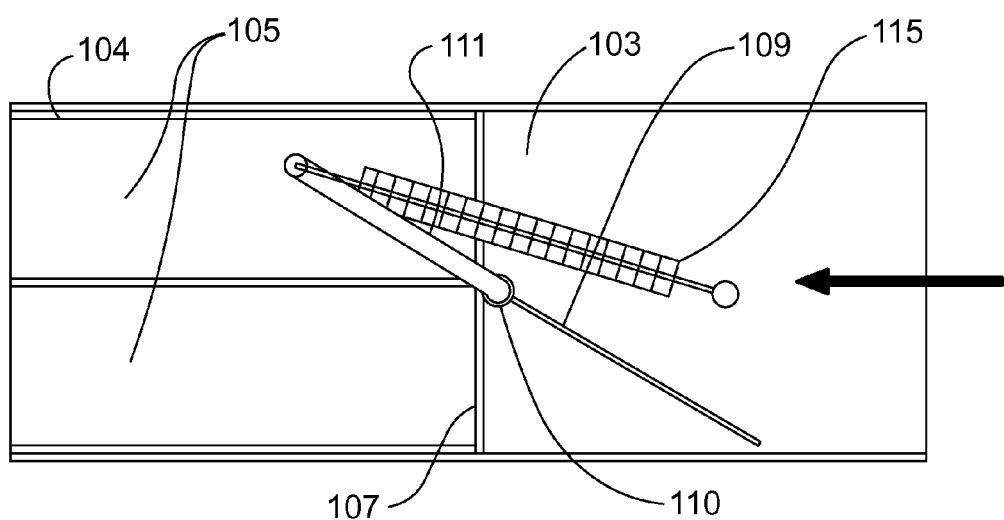

Unless otherwise indicated illustrations in the figures are not necessarily drawn to scale.

DETAILED DESCRIPTION OF THE PREFERRED EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present application or of any further application derived therefrom.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

As is well known to those skilled in the art, many careful considerations and compromises typically must be made when designing for the optimal manufacture of a commercial implementation of any system, and in particular, the embodiments of the present invention. A commercial implementation in accordance with the spirit and teachings of the present invention may be configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

It is to be understood that any exact measurements/dimensions or particular construction materials indicated herein are solely provided as examples of suitable configurations and are not intended to be limiting in any way. Depending on the needs of the particular application, those skilled in the art will readily recognize, in light of the following teachings, a multiplicity of suitable alternative implementation details.

A practical embodiment of the present invention provides a diverting device that enables a medium to be routed through one of two channels or simultaneously through both channels. In one practical embodiment, the diverting device is incorporated into a single chamber that may be installed on a motorcycle exhaust system from which exhaust may be directed along a desired route. Many practical embodiments may be implemented as part of an exhaust system that can be run muffled, semi-muffled or unmuffled with the movement of a lever.

Figure 1C:
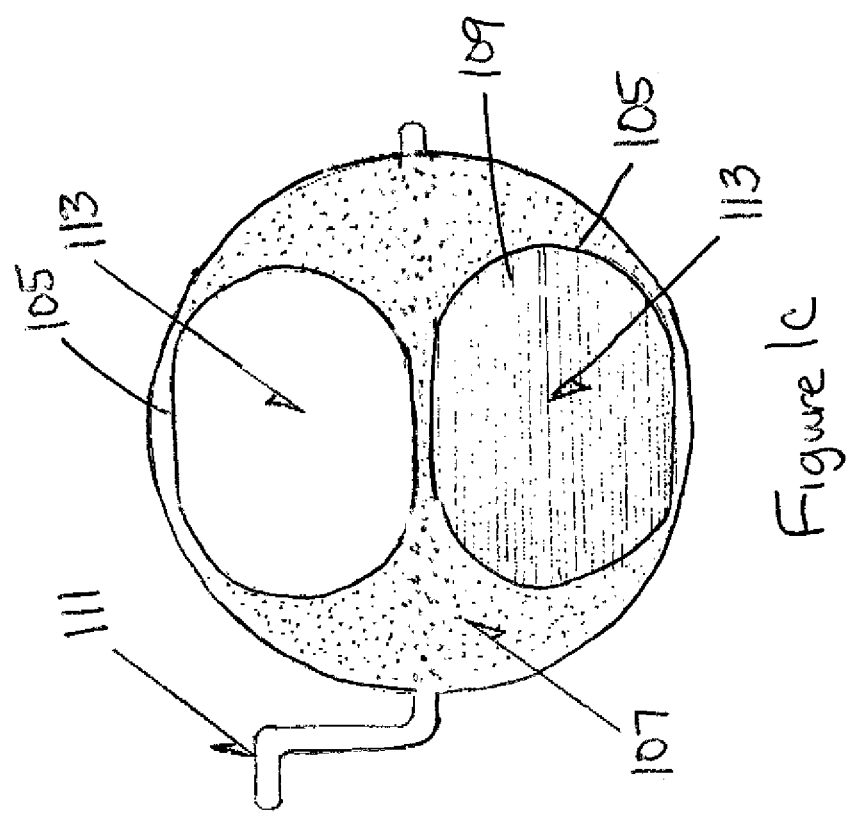

FIGS. 1A through 1C illustrate an exemplary diverting device, in accordance with an embodiment of the present invention. FIG. 1A is a cut away side view. FIG. 1B is a diagrammatic end view of an inlet chamber 103, and FIG. 1C is a diagrammatic end view of an outlet chamber 104. In the present embodiment, the diverting device comprises inlet chamber 103 and outlet chamber 104, which are divided by a wall 107. Inlet chamber 103 and outlet chamber 104 are cylindrical in shape; however, in some alternate embodiments these chambers may be round, oblong, square, etc. Furthermore, the inlet and outlet chambers may be implemented in various different diameters to provide chambers that can be virtually any size. In the present embodiment, outlet chamber 104 comprises diverter channels 105, which are ovular tubes connected to wall 107. It is contemplated that diverter tubes in some alternate embodiments may have various different shapes such as, but not limited to, circular or square tubes. Other alternate embodiments may be implemented without diverter channels and instead may comprise an outlet chamber that is divided into two chambers by a wall. In the present embodiment, a diverter flap 109 comprising a half wing shape is pivotally attached to wall 107 at an attachment point 110, and a lever 111 connected to diverter flap 109 enables diverter flap 109 to be rotated about attachment point 110. Referring to FIGS. 1B and 1C, wall 107 comprises two holes 113 that correspond to diverter channels 105. The diverter device may be made of various different metals including, without limitation, aluminum, chrome or stainless steel. In some alternate embodiments the diverter device may be made of different materials such as, but not limited to, various plastics, composite materials or a combination of materials.

In the present embodiment, the diverter device can be used for routing many different materials including, without limitation, air, gases, fluids, marbles, shot bead, sand, etc. Upon entering the diverting device at inlet chamber 103, a material is routed through diverter channels 105. The movement of lever 111 raises or lowers diverter flap 109 to route incoming material to one of diverter channels 105 or through both diverter channels 105. In the present embodiment raising lever 111 lowers diverter flap 109 to route the material through the upper diverter channel 105, and lowering lever 111 raises diverter flap 109 to route the material through the lower diverter channel 105. Diverter flap 109 may also be positioned at any point between the upper and lower limits to allow flow through both diverter channels 105. The amount of flow routed to each diverter channel 105 can be controlled by adjusting the angle of diverter flap 109 to more fully open or block a particular diverter channel 105. A spring 115 holds diverter flap 109 in position. Spring 115 comprises an over-center design. Each end of the spring has an eyelet attached to it. One end of spring 115 is attached to lever 111. The other end of spring 115 is attached to a stationary post on the outer tube wall. The post and lever 111 each have a groove to keep spring 115 in place. When diverter flap 109 opens to either diverter channel 105, then spring 115 is retracted holding diverter flap 109 in position. When lever 111 is rotated to select the other diverter channel 105, spring 115 stretches going over attachment point 110 then retracts holding diverter flap 109 in the opposite selected position.

In some alternate embodiments the diverter channels may be positioned in a side-by-side configuration or at an angle rather than in a stacked configuration. In these embodiments, the diverter flap and lever are positioned to properly correspond to the position of the diverter channels. In the present embodiment, lever 111 can be pushed or pulled by the hand or foot of a user to direct the flow of material. It is contemplated that a multiplicity of suitable means may be used in some alternate embodiments to move the lever or the diverter flap directly including, without limitation, cable, electric motors, vacuum operations, etc. Furthermore, in some of these embodiments, and in some manually operated embodiments, means other than a lever may be used to control the motion of the diverter flap such as, but not limited to, dials, sliders, cranks, etc.

Many practical embodiments of the present invention are compact and can be exclusively designed for motorcycle exhaust applications. Embodiments implemented for motorcycle applications are typically designed with chambers that are four inches in diameter or smaller and may have up to four pipes entering the diverting device that splits into two exiting pipes. These embodiments may be adapted for use with a wide variety of different factory and aftermarket motorcycle exhaust systems. For example, without limitation, Harley Davidson motorcycles are common and may be a customary application; however, diverting devices according to some practical embodiments of the present invention may be adapted for other V twin manufacturers as well as for four-cycle motorcycles and other types of motorcycles. In addition, some alternate embodiments may be implemented for use with other types of vehicles such as, but not limited to, dirt bikes, all terrain vehicles, snowmobiles, go-carts, riding lawn mowers, etc. Some practical embodiments may be used as part of customizing a motorcycle with an aftermarket exhaust system. Other practical embodiments may be used to customize an original factory exhaust system. In the application of one such embodiment, the catalytic converter of the original exhaust system is removed and replaced with a diverting device. Generally, aftermarket exhaust systems do not include catalytic converters; therefore, this application may be cost efficient by allowing a user to retain the original exhaust and modify it.

Figure 2:
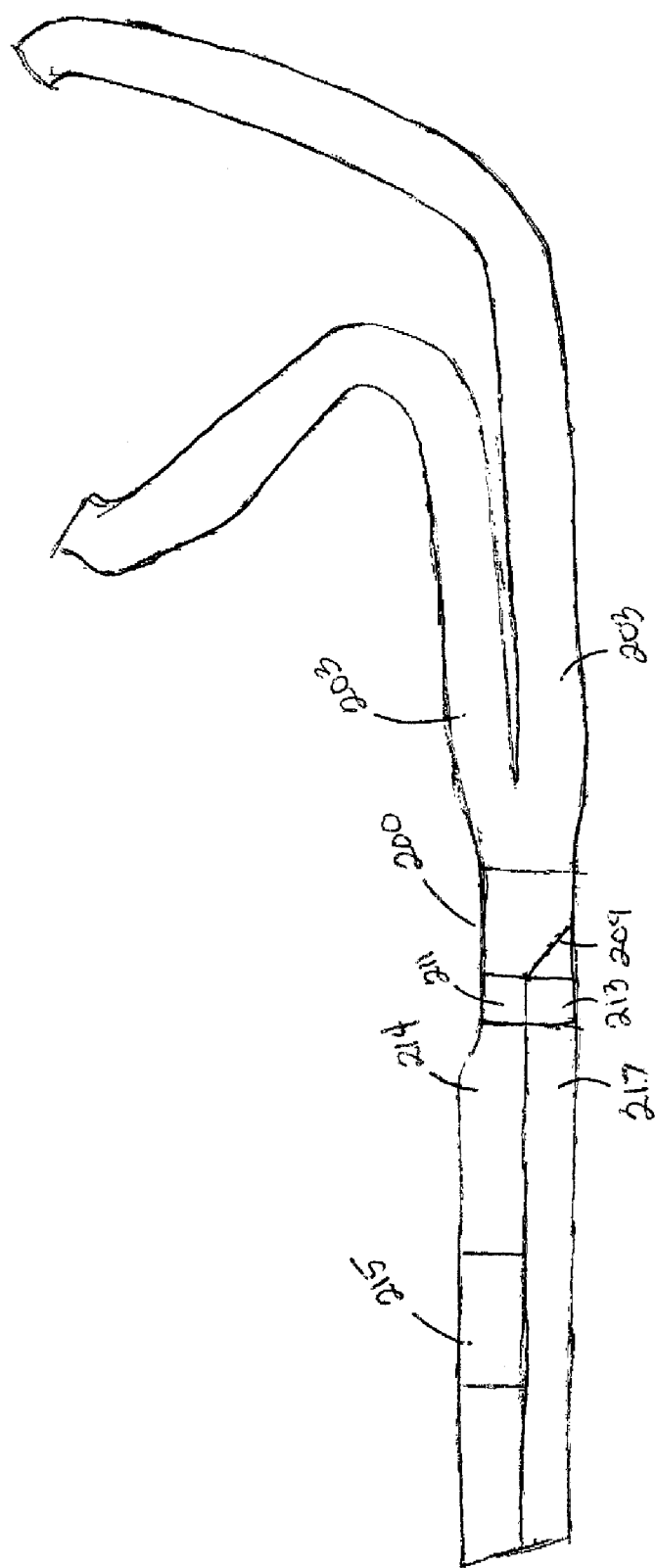
FIG. 2 is a cross sectional side view of an exemplary diverting device installed on a motorcycle exhaust, in accordance with an embodiment of the present invention.

FIG. 2 is a cross sectional side view of an exemplary diverting device 200 installed on a motorcycle exhaust, in accordance with an embodiment of the present invention. In the present embodiment, diverting device 200 is installed on existing head pipes 203 to allow exhaust to run through a muffled, partially muffled or unmuffled system. The exhaust flows from the motorcycle engine through head pipes 203 of the original factory or aftermarket exhaust system. Head pipes 203 combine into one pipe before reaching diverter device 200; however, in some alternate embodiments, separate head pipes can be attached to the diverter device. In the present embodiment, as the exhaust exits head pipes 203, it enters diverting device 200. The inlet of diverter device 200 guides the exhaust to a diverter flap 209 where the exhaust is routed to one of two exiting channels 211 or 213 or a combination of both. Exiting channel 211 leads to a pipe 214 comprising a muffler 215, and exiting channel 213 leads to an open pipe 217. Referring to the figure, diverter flap 209 is shown in a position to route all of the exhaust to exiting channel 211 and into muffled pipe 214. Diverting device 200 comprises slip fit ends that fit over the existing ends of head pipes 203 and exiting pipes 214 and 217 and can be welded or clamped into place. In some alternate embodiments, the device may taper at the ends to enable it to be inserted into the head pipes and exiting pipes. In typical use of the present embodiment, diverting device 200 enables a user to obey noise ordinances and be able to use an open exhaust for sanctioned racing events or in areas with no noise ordinances with the simple movement of a small lever, as shown by way of example in FIGS. 1A through 1C. The user may also partially open diverting device 200 to open pipe 217 to give warning of their presence to other motorists in congested traffic areas.

In the present embodiment, routing functions are contained in a single simple device, diverting device 200, and there is minimal movement of diverter flap 209. This typically provides unrestricted flow of exhaust and generally does not cause the flow of exhaust to stop, reverse or find a new path to function correctly, which may occur with the use of butterfly valves common in currently available systems. Also, diverter device 200 is easy to install to a multiplicity of suitable vehicles unlike one currently available diverting device that is designed for automobiles, is only made in a two-inch diameter Y configuration and is made of cast iron. Cast iron is difficult to attach to any other metal, and the Y shape of this device makes it difficult to use in motorcycle applications. Another currently available design provides a switching device on the rear of the muffler, which requires a user to stop and rotate an end cap on the muffler. Mufflers can become hot, and placing the switching device on the muffler may cause the user to receive burns. The lever to actuate diverter device 200 is located away from muffler 215, which generally prevents a user from receiving burns from operating diverter device 200. Furthermore, diverter device 200 blends with the design of the exhaust system, and it is typically difficult to determine from the outside that the exhaust system has been modified. Some embodiments may comprise chrome shields to enable the device to more fully blend into the exhaust system.

Figure 3:
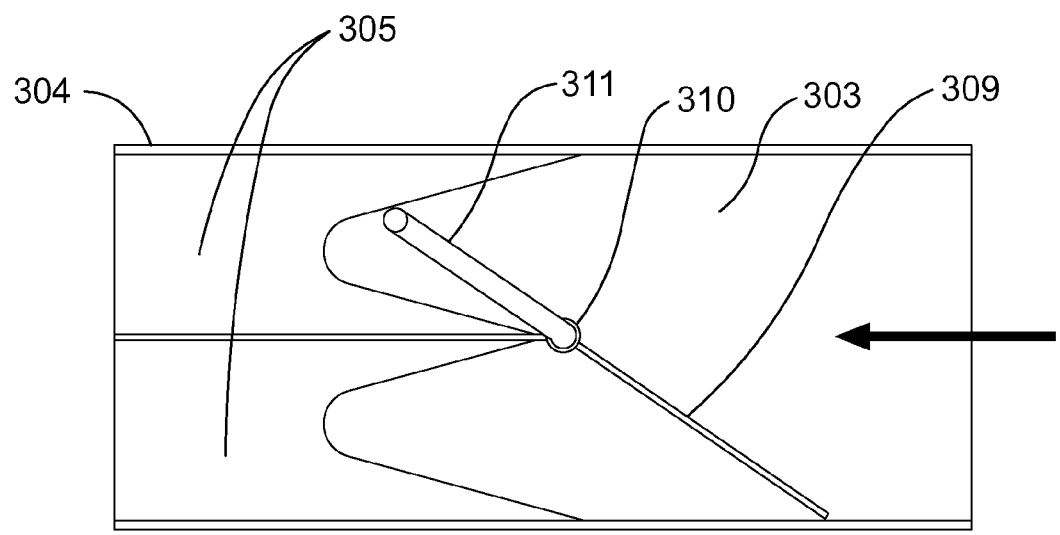
FIG. 3 is a cutaway side view of an exemplary diverting device, in accordance with an embodiment of the present invention.

FIG. 3 is a cutaway side view of an exemplary diverting device, in accordance with an embodiment of the present invention. In the present embodiment, the diverting device comprises an inlet chamber 303 and an outlet chamber 304 with two exit channels 305. A diverter flap 309 is pivotally mounted to a point 310 where the inlet ends of diverting channels 305 meet and is controlled by a lever 311. In the present embodiment, there is no wall to separate inlet chamber 303 from outlet chamber 304. This separation is solely provided by diverter flap 309. This is believed to provide a no resistance flow of the material through the diverting device as illustrated by the u-shaped lines.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Having fully described at least one embodiment of the present invention, other equivalent or alternative methods of providing a diverter device according to the present invention will be apparent to those skilled in the art. The invention has been described above by way of illustration, and the specific embodiments disclosed are not intended to limit the invention to the particular forms disclosed. For example, the particular implementation of the exit channels may vary depending upon the particular type of configuration used. The configurations described in the foregoing were directed to straight implementations; however, similar techniques are to provide diverter devices with exit channels in different configurations such as, but not limited to, forked configurations, Y configurations, T-configurations, L-configurations, etc. Implementations of the present invention with various different configurations are contemplated as within the scope of the present invention. The invention is thus to cover all modifications, equivalents, and alternatives falling within the spirit and scope of the following claims.

Claim elements and steps herein may have been numbered and/or lettered solely as an aid in readability and understanding. Any such numbering and lettering in itself is not intended to and should not be taken to indicate the ordering of elements and/or steps in the claims.

What is claimed is:

1. An apparatus comprising:
    an input chamber, said input chamber being configured for accepting a flow of material from at least one head pipe of at least one exhaust system of a vehicle engine, wherein said input chamber being configured to substantially couple to said at least one head pipe of said exhaust system of said vehicle engine, in which said input chamber being further configured to substantially control a noise level associated with said exhaust system of said vehicle engine;
    an output chamber being configured for substantially accepting said flow of material from said input chamber, in which said output chamber comprises a first channel, said first channel comprises a muffler and a first pathway, wherein said muffler substantially control said noise level, said output chamber further comprises a second channel, said second channel comprises an open pipe and a second pathway, wherein said open pipe being configured for substantially flowing said material along said second pathway unmuffled;
    a diverter member being disposed within said input chamber, said diverter member comprising a substantially half wing shape being pivotally into engagement with a juncture of said input chamber and said output chamber, said diverter member being configured to be substantially positioned at a generally first position for substantially diverting said flow to said first pathway, said diverter member being further configured to be substantially positioned at a generally second position for diverting the flow to said second pathway, said diverter member further being configured to be generally positioned at a point generally between said first and second position for substantially diverting said flow to said open pipe and said muffler; and
    a lever mechanism extending externally to said input chamber and said output chamber, said lever mechanism being operable for moving said diverter member to said first position, said second position or said point generally between said first and second position.

2. The apparatus as recited in claim 1, in which said half wing shape of said diverter member comprises a portion of an intersection of said input chamber and a generally diagonal plane containing an axis of said pivotal engagement at said juncture.

3. The apparatus as recited in claim 1, in which said first pathway and said second pathway are separated by at least one wall.

4. The apparatus as recited in claim 1, in which said first pathway and said second pathway each comprise a tubular member.

5. The apparatus as recited in claim 1, in which said vehicle engine is a motorcycle.

6. The apparatus as recited in claim 1, further comprising a wall at said juncture, said wall comprising a first opening to said first pathway and a second opening to said second pathway.

7. The apparatus as recited in claim 3, in which said diverter member is pivotally into engagement with said wall.

8. The apparatus as recited in claim 1, in which said output chamber is coupleable to said exhaust pipe of said vehicle engine.

9. The apparatus as recited in claim 8, in which said motor vehicle engine is a motorcycle.

10. The apparatus as recited in claim 1, further comprising a retention mechanism for urging said diverter member to substantially remain in said first position when placed in said first position, and for urging said diverter flap to substantially remain in said second position when placed in said second position.

11. The apparatus as recited in claim 10, in which said retention mechanism comprises a spring.

12. The apparatus as recited in claim 11, in which said spring being configured into engagement with said lever and to an outer wall of the apparatus in an over-center design.

13. An apparatus comprising:
    an input chamber being configured for accepting a flow of material, wherein said input chamber being configured for coupling to at least one head pipe of a motor vehicle engine, in which said input chamber further being configured to control a noise level associated with at least one exhaust pipe from said motor vehicle engine;
    an output chamber, said output chamber being configured into engagement with said input chamber, in which said output chamber comprises a first pathway of a first channel and a second pathway of a second channel, said output chamber being configured for accepting said flow of material from said input chamber and for substantially flowing said material along said first pathway and said second pathway, said first pathway and said second pathway being separated by at least one separating wall, in which said first pathway comprises a muffler, wherein said muffler being configured for substantially controlling said noise level from said exhaust pipe of said vehicle engine, said second pathway of said second channel comprises an open pipe, wherein said open pipe being configured for unrestricting said flow of material;
    a wall disposed at a juncture of said input chamber and said output chamber, said wall comprising a first opening to said first pathway and a second opening to said second pathway;
    a diverter member being disposed within said input chamber, in which said diverter member comprising a generally half wing shape being pivotally into engagement with said wall between said first opening and said second opening, in which said half wing shape comprising a portion of an intersection of said input chamber, wherein said diverter member being operable to be generally positioned at a first position for substantially diverting said flow to said muffler of said first pathway, said diverter member further being configured to be generally positioned at a second position for substantially diverting said flow to said open pipe of said second pathway, in which said diverter member further being configured to be operable to be generally positioned at a point generally between said first and second position for substantially diverting said flow to said open pipe and said muffler;
    a lever mechanism substantially extending externally to said input chamber and said output chamber, wherein said lever mechanism being operable for substantially moving said diverter member to said first position, said second position or said point generally between said first and second position; and a retention mechanism for substantially urging said diverter member to generally remain in said first position when placed in said first position, and for substantially urging said diverter flap to generally remain in said second position when placed in said second position, said retention mechanism comprising a spring being configured into engagement with said lever and to an outer wall of the apparatus in an over-center design.

14. The apparatus as recited in claim 13, in which said first pathway and said second pathway each comprise a tubular member.

\* \* \* \* \*